United States Patent [19]

Berthaud et al.

[11] Patent Number: 4,904,829
[45] Date of Patent: Feb. 27, 1990

[54] ACTUATOR-CONTROLLED KEYLOCK SWITCH

[75] Inventors: Denis Berthaud, Saint Michel; Andre Vergez, St Germain, both of France

[73] Assignee: La Telemecanique Electrique, Nanterre, France

[21] Appl. No.: 173,532

[22] Filed: Mar. 25, 1988

[30] Foreign Application Priority Data

Mar. 27, 1987 [FR] France .................. 87 04293

[51] Int. Cl.⁴ .................. H01H 9/28; H01H 27/08
[52] U.S. Cl. .................. 200/50 R; 200/43.04; 200/43.07; 200/61.62; 200/61.67
[58] Field of Search .................. 200/43.01–43.21, 200/50 R, 50 B, 61.62–61.68

[56] References Cited

U.S. PATENT DOCUMENTS

| | | |
|---|---|---|
| 4,395,608 | 7/1983 | Eicker et al. .................. 200/43.07 X |
| 4,454,392 | 6/1984 | Rapp et al. .................. 200/43.07 X |
| 4,524,251 | 6/1985 | Schulz .................. 200/43.07 |
| 4,658,102 | 4/1987 | Seim et al. .................. 200/43.07 X |
| 4,695,684 | 9/1987 | Bochard et al. .................. 200/43.07 |

FOREIGN PATENT DOCUMENTS 0184033  6/1986 European Pat. Off.
3309372  9/1984 Fed. Rep. of Germany.
2569303  2/1986 France.
2173043 10/1986 United Kingdom.

OTHER PUBLICATIONS

"Immer auf der sicheren Seite", *Elektro Anzeiger*, No. 9, 1985, by B. Kirschbaum.

Primary Examiner—J. R. Scott
Attorney, Agent, or Firm—Young & Thompson

[57] ABSTRACT

A key attached, for example, to the door of an electrical equipment cubicle is capable of sliding within a passageway so as to cause pivotal displacement of a cam and upward displacement of a push-rod, thus releasing a switch lug. A locking rod forming part of a slide-block which is coupled with the push-rod is capable of moving between a locking position in which an annular channel permits displacement of the key and an unlocking position in which the locking rod is engaged within a key notch. One end of the slide-block projects from the top face of the switching unit head in order to be downwardly displaced by an actuator, whereupon the key can be withdrawn without difficulty or danger.

12 Claims, 3 Drawing Sheets

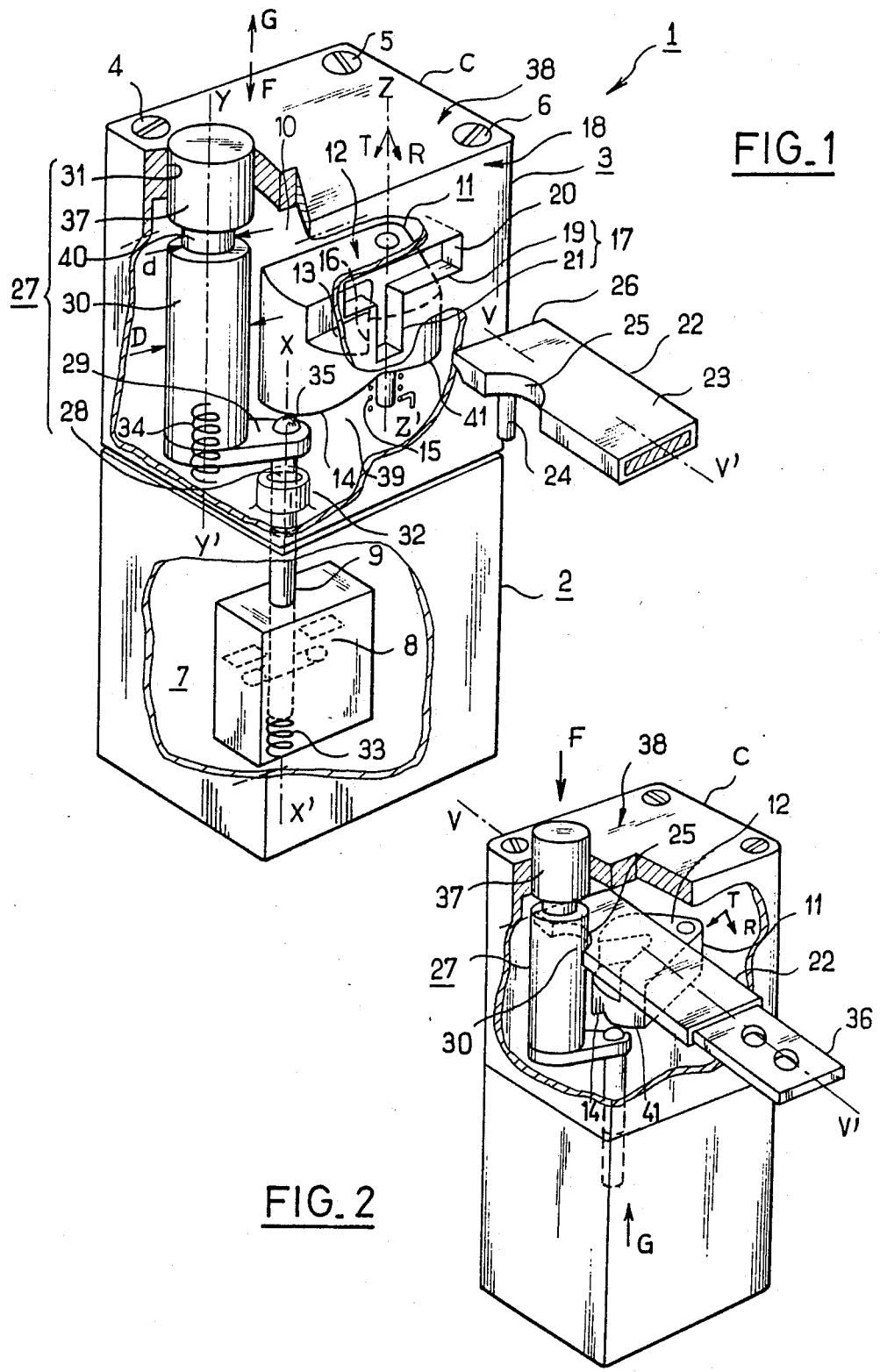
FIG_1
FIG_2

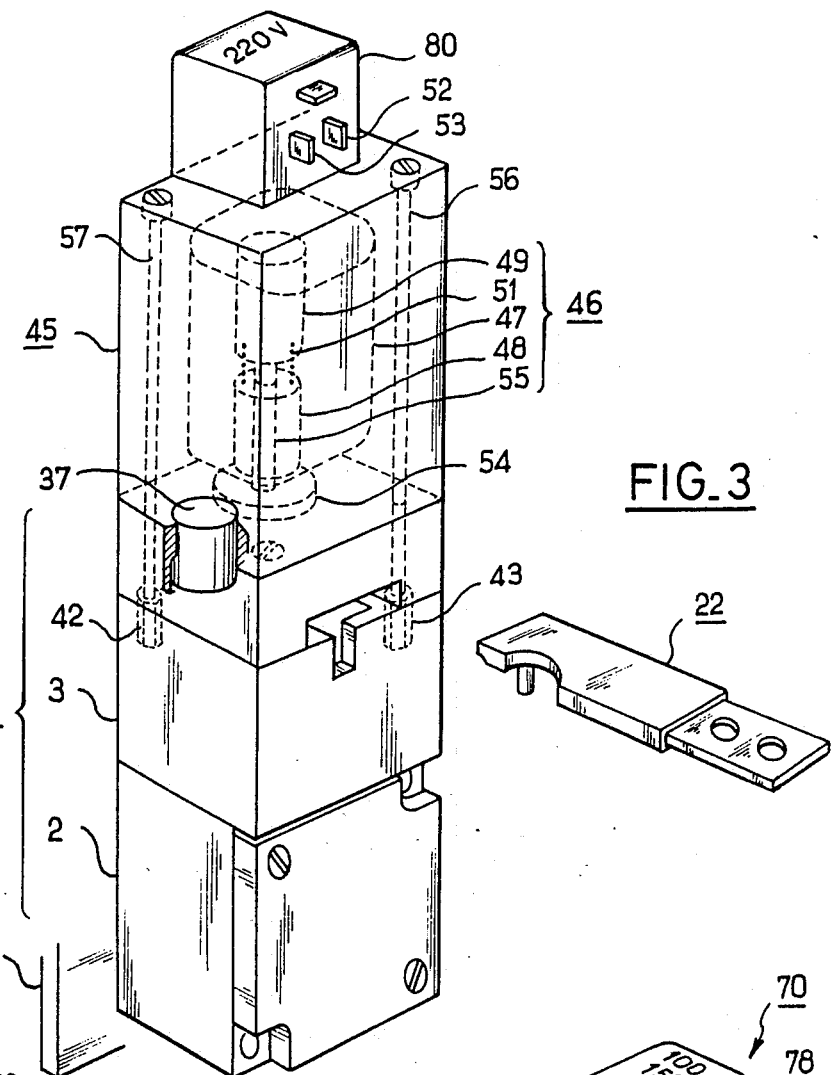
FIG_3
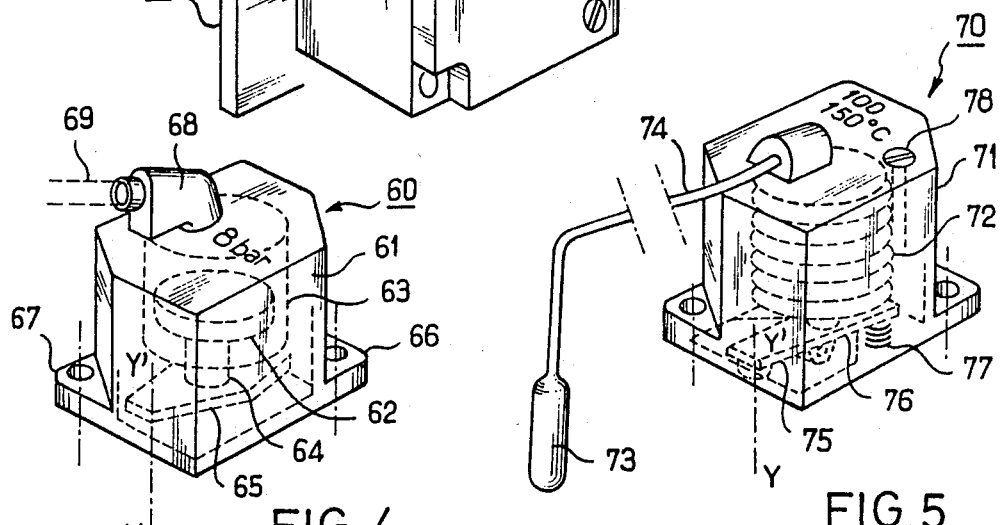
FIG_4  FIG_5

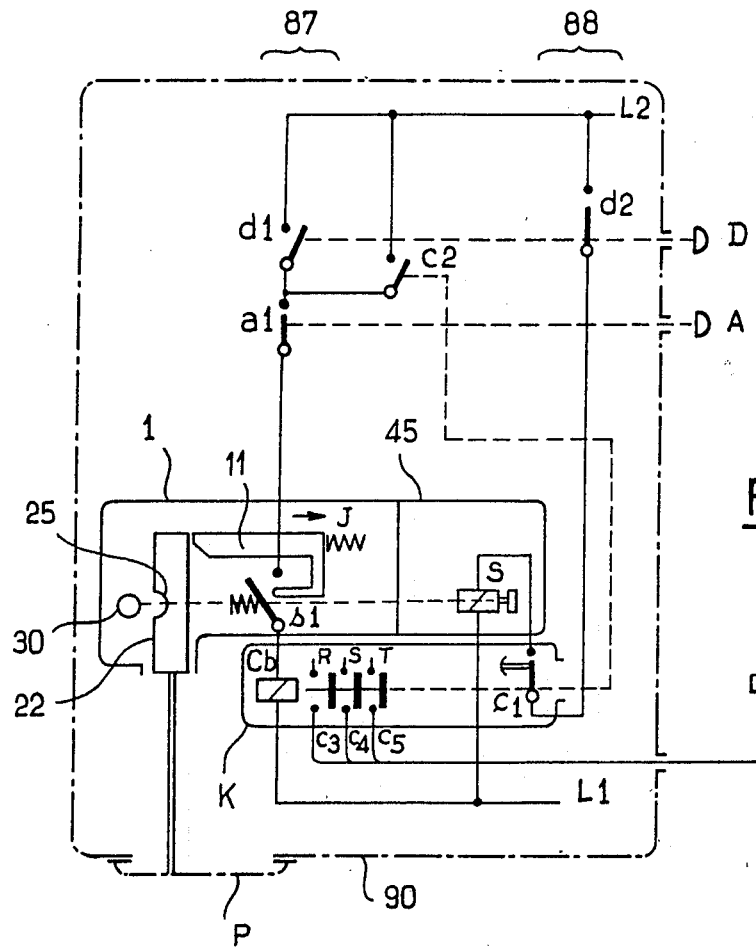
FIG_7
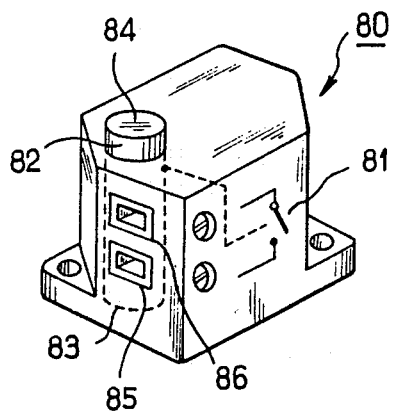
FIG_6
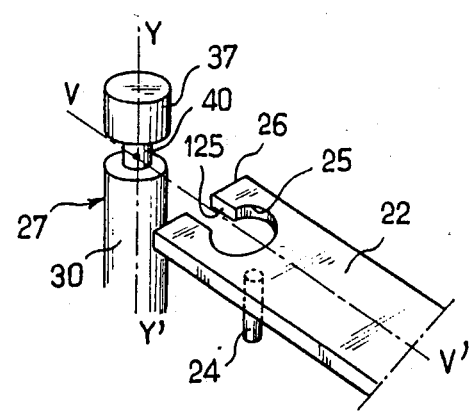
FIG_8

ACTUATOR-CONTROLLED KEYLOCK SWITCH

FIELD OF THE INVENTION

The present invention relates to a keylock safety switching unit in which provision is made for at least one switch accommodated within a casing and actuated from a movable component by means of a slidably mounted transmission push-rod. The movable component is placed within a head associated with the casing and is capable of displacement conjointly with a key adapted to be selectively inserted in the head. A locking member controlled by an ancillary actuating device responsive to an external parameter other than the movement of the key is adapted to selectively lock the key within the head.

BACKGROUND OF THE INVENTION

Switching units of this type are frequently employed in circuits for controlling installations or machines in order to perform on-off control of all or part of their functions.

Potential applications are numerous. In one example, the key is secured to the inner face of the door of a cubicle which is intended to remain closed when the electric equipments placed within said cubicle are in the energized state. When the door is closed, the key is inserted within the head of the unit, which is secured to the cubicle itself. Upon opening of the door, the key automatically moves apart from the unit, thus automatically deenergizing the equipment. In another application, the key is rigidly fixed to the gate of an industrial elevator said gate needing to be closed prior to startup, for obvious safety reasons. frequently encountered, the operation of the switch is inhibited or locked in response to the appearance or disappearance of certain supplementary conditions. For example, in the case of an elevator, when the elevator is moving between two floors, the key is locked within the head of the unit, thus mechanically preventing opening of the gate and deenergization of the elevator motor.

In a known switch of this type as described in an article by B. Kirschbaum in the review entitled Elektro Anzeiger, Nr. 9 (1985), a large-sized casing is designed to accommodate a device for controlling the switch by means of a key as well as an electromagnet for selectively immobilizing the key as a function of a predetermined operating parameter.

The advantage of this arrangement lies in the fact that the abnormal forces which are liable to arise at the time of any fraudulent attempt to open the casing are transferred to the key which constitutes a high-strength component. However, this arrangement takes up considerable space. At the same time, the length of the key becomes so substantial that it is hardly possible to contemplate movement of introduction of said key along a nonrectilinear path of travel, e.g. a circular path if the key is secured to the door, unless the key is mounted on an orientable support of relatively complicated design. Furthermore, this device does not as a practical matter allow controlling the locking of the key in the head by means of an element other than the internal electromagnet. This is a serious drawback because the external parameter to be taken into account is liable not to be directly or easily available in the form of an electric signal adapted to be fed to the electromagnet.

In a switching device which is also known and disclosed in French patent N° 2 569 303, an electromagnet selectively locks a special transmission rod placed between the switch and the movable component. This feature is comparable to the electromagnet of the previously known embodiment, and has the disadvantage of requiring, if an external condition is to be taken into account, disassembly of the standard switching unit (comprising only the casing on the head) in order to mount an intermediate casing between the casing which accommodates the switch and the head which is intended to receive the key. Furthermore, in the event of fraud such as, for example, an attempt to open the door to which the key is attached, the moveable component may be subjected to excessive efforts which would in turn be liable to cause its destruction. Finally, according to the prior patent, there is no actuation of the switching means by the electromagnet, the electromagnet merely locks the movable component.

OBJECT OF THE INVENTION

The present invention consequently proposes to provide a keylock safety switching unit which corresponds to the constructional design mentioned in the beginning of the specification in which an internal key-locking device is adapted to be selectively operated by means of any suitable external actuator such as an electromagnet, a small jack, a thermometric probe or an expansion-type barometric probe without any risk that mounting of said external actuator will impair the fluid tightness of the switch casing. It will be readily apparent that the switching unit under consideration is capable of operating normally and in other applications without the aforementioned actuator.

SUMMARY OF THE INVENTION

In accordance with the invention, the object of the invention is achieved when the switching unit can be actuated in addition by means of a slide-block which constitutes said locking member, which is placed within the head and which is coupled with the transmission push-rod. Said slide-block has on the one hand a locking surface which is capable of locking the key and has on the other hand an accessible end portion in the vicinity of a face of the head for receiving the action of the ancillary actuating device located externally to the casing and to the head.

BRIEF DESCRIPTION OF THE DRAWINGS

These and other features of the invention will be more apparent to those versed in the art upon consideration of the following description and accompanying drawings, wherein:

FIG. 1 is a partially cutaway view in perspective showing the switching unit in accordance with the invention when no provision is made for ancillary actuating means and when the unit is not occupied by a key;

FIG. 2 is a perspective view which is similar to FIG. 1 and shows how the key is locked after introduction;

FIG. 3 is a perspective view in which an electromagnetic actuator is associated with the switching unit of FIG. 1;

FIGS. 4 and 5 show two other types of actuators which are capable of controlling the locking device as a function of pressure and temperature variables respectively;

FIG. 6 shows an auxiliary contact element designed for insertion between the switching-unit head and one of the actuators mentioned above;

FIG. 7 is an electric circuit diagram illustrating one possible application of the switching unit with an actuator of the electromagnetic type;

FIG. 8 is a view in perspective showing an alternative key design.

DESCRIPTION OF PREFERRED EMBODIMENTS

A switching unit 1 in accordance with the invention as shown in FIG. 1 comprises a casing 2 and a head 3 which are secured to each other by means of four screws such as those designated by the reference numerals 4, 5, 6. By way of example, the screws are disposed in a square in order to permit orientation of the head with respect to the casing in one of four rectangular directions A, B, C, D.

An internal space 7 of the casing 2 contains a switching device 8 or a set of switching devices, the operating member 9 of which is capable of displacement along an axis X—X'.

Within an internal space 10 of the head 3 is located movable component which is a rotary member 11 displacement about an axis Z—Z' parallel to the axis X—X'.

Said rotary member has the general shape of a cylindrical sector. A recess 13 is formed in the upper face 12 of said member 11. A cam surface 14, opposed to recess 13, is formed in said member 11. The cam surface 14 is directed towards the casing 2. A resilient element 15 having an axis Z—Z' tends to maintain the rotary member 11 in an angular position of rest (as shown in FIG. 1) in which the entrance 16 of the recess 13 registers with a keyhole opening 17 formed through a front face 18 of the head.

The opening 17 has a horizontal portion 19 which is parallel to the joint plane between head 3 and casing 2 and constitutes the entrance of a passageway 20 extending above the face 12, and a vertical portion 21 with which the recess entrance 16 registers when the rotary member 11 is in the rest position.

The opening 17 permits the introduction of a key 22 into the head 3 along an axis V—V' at right angles to the axes X—X' and Z—Z''. Said key 22 has a flat body 23 of elongated shape extending along an axis which corresponds to the axis V—V' at the time of introduction and is provided with a stud 24 which is rigidly fixed to one face of said body 23.

At the time of introduction, the body 23 and stud 24 respectively are inserted in the portions 19, 21 of the keyhole or opening 17. In addition, said key body 23 is provided in the vicinity of its extremity 26 with a lateral notch 25 having a circular contour.

A slide-block 27 extends within the head 3 along an axis Y—Y' which is parallel to the axis X—X'. Said slide-block is capable of displacement along said axis Y—Y' and is secured to a transmission push-rod 28 having an axis X—X' and slidably mounted within a guide bearing 32.

A transverse coupling portion 29 placed beneath the cam surface 14 within an internal space 39 which is inaccessible in particular from the opening 17 has the function of coupling the transmission push-rod 28 with a rod 30 of the slide-block, said rod 30 having a diameter D. Said coupling portion 29 also carries on the axis X—X' a lug 35 directed towards the cam surface 14 and adapted to cooperate with said cam surface 14.

The slide-block 27 is guided axially within a bore 31 of the head and is positioned angularly by the push-rod 28. At its end remote from the transverse portion 29, the slide-block rod 30 is adjacent to an annular channel 40 having a reduced diameter d.

The path of travel of the slide-block rod 30 extends partially within the passageway 20 provided for the body 23 of the key 22. Thus the rod 30 or the annular channel 40 can appear within said passageway 20, adjacent to the key notch 25 when the key is inserted within the passageway 20.

Resilient means, provided by a switchrestoring spring 33 which produces action in the direction G and/or by a spring 34 associated with the slide-block 27 so as to produce action in the same direction, bias the lug 35 against the cam surface 14.

Thus, assuming first that the slideblock 27 is free to move with the push-rod 28, the angular movements of the rotary member 11 produce displacements of the push-rod 28, the slide-block 27 and the operating member 9 either in the direction G or in the direction F.

When the rotary member 11 is in its rest position R as illustrated in FIG. 1, the annular channel 40 registers with the passageway 20. When said rotary member 11 is located in a work position T in which the top portion 41 of the cam surface 14 is in contact with the lug 35, the slide-block has carried out under the action of the spring or springs, 33, 34 a displacement in the direction G whereupon the rod 30 projects within the passageway 20. This movement has also caused release of the switch or switches 8, to the closed condition in the example.

In use of the switching unit, the key 22 is first inserted in the opening 17. Since the stud 24 follows a path leading to entry 16 of the recess 13, said stud engages the recess 13 and then produces a rotational displacement of the rotary member 11, due to the path of travel of the stud 24 passing extending at a distance from the axis Z-Z'. Rotational displacement of the member 11 produces a movement of separation and relative withdrawal of the cam surface 14 and the lug 35. This may arise from the fact that an ancillary actuating device (described below) which produces action on the top end 37 of the slide-block 27 prevents said slide-block 27 and consequently the push-rod 28 from moving upwards as an d when permitted by the cam 14. However, the aforementioned movement of relative withdrawal of cam surface and lug is in any case the result of engagement of the body 23 of the key 22 within the annular channel 40, said engagement having the effect of retaining the slideblock 27 in position at the lower end of its path of travel against the action of the springs 33, 34. Upon continued insertion of the key 22, the notch 25 then reaches a position flush with the rod 30 of the slide-block 27. This allows the slide-block to undergo movement in the direction G whereupon the rod 30 projects within the notch 25 and thus within the passageway 20. The diameter of the notch is slightly larger than the diameter D of the rod as shown in FIG. 2. The relative position of the passageway 20 and of the axis Y—Y' is such that the axis Y—Y' coincides with the center of the circular sector contour of the notch when the key reaches the position of release of the rod 30.

When this work position T of the key 22 is reached, it is no longer possible either to insert the key to a greater extent or to withdraw the key since it is securely held in position by interengagement of the notch 25 and rod 30. Any fraudulent attempt to remove the key is therefore not liable to damage the movable components of the switching unit such as the components 11, 28 and 9. Consequently, and within the scope of the design function of the switching unit under consideration, any mechanical part such as, for example, a cubicle door connected to the tail end 36 of the key cannot be displaced before the key has been unlocked by other means.

As will be noted from FIG. 2, in the work position T, the top portion 37 of the slide-block 27 projects above the top face 38 of the head through the bore 31 of said face.

Unlocking can be carried out by exerting a thrust on the top end 37, of the slide-block 27 in a direction F, thus again bringing the annular channel 40 to a position in which it registers with the passageway 20.

Among the main types of actuators which are well suited for operation with the switching unit in accordance with the invention in order to produce action on the top end 37, those which are particularly worthy of mention make use of an electromagnet, a fluid pressure and a temperature in order to permit or prevent withdrawal of the key as a function of the corresponding electrical or physical external parameters.

FIG. 3, again shows a switching unit 1 comprising the casing 2, the head 3 and the key 22 as well as an associated body 45 accommodating an electromagnet 46 having a coil 47, a magnetic yoke, only one portion 48 of which is illustrated in the figure, and a plunger core 49 which is subjected to the resilient action of a restoring spring 51. When no voltage is applied to the terminals 52, 53 of the connector 50 for supplying current to the coil 47, the restoring spring 51 maintains the plunger core 49 in a rest position which is transmitted to an annular flange 54 by means of a rod 55, said rod being slidably mounted within said portion of yoke 48, The rest position is the position of maximum spacing between the annular flange 54 and the casing 2.

The annular flange 54 has a sufficiently large transverse dimension to face the top end 37 and to initiate downward displacement of this latter when the plunger core 49 changes over from its position of rest to a work position nearer the casing 2. Two screws 56, 57 have been substituted for the original screws 4, 6 in order to attach the body 45 to the face 38 and engage within two threaded bores 42, 43 of the casing 2.

Mounting of the actuator does not entail any need for disassembling the head 3 from the casing 2 and makes it possible to set the body 45 in one of the four possible orientations with respect to the head 3.

There is shown in FIG. 4 a pressure actuator 60 comprising a body 61 which is shown separate from the switching unit 1. The actuator body 60 accommodates an internal compressed-air device 62 which is comparable with a small jack having a cylinder 63 and an output rod 64. A restoring spring not shown in the figure biases said rod 64 in a rest position corresponding to its lower end of travel within the cylinder 63.

An arm 65 attached to the rod 64 is placed above the top end 37 when the actuator body 61 is fixed on the head 3 by the means of its two coupling flanges 66, 67. The need to allow for selective orientation of the body 61 with respect to the head 3 of a unit is less essential in this case if as shown, a rotatable compressed-air coupling 68 fitted with a flexible hose 69 is provided.

FIG. 5 illustrates a thermal actuator 70 having a body 71 containing for example a deformable bellows element 72, the closed internal space of which is filled with a fluid, a communication between said internal space and a thermometer probe 73 being established by means of a coupling tube 74.

The deformations of the bellows element are advantageously transmitted to an intermediate lever 75, 76 which is associated with a restoring spring 77 in this embodiment. Said spring develops the force required for downward displacement of the top end 37 located beneath the lever 75 when the temperature of the probe falls below a predetermined threshold value which may be adjustable by means of a screw 78 if necessary.

All said bodies 45, 60, 70 will preferably have a transverse cross-section which is inscribed within the contour C of the mounting face 38 of the switching-unit head 3 in order to prevent any portion of said bodies 45, 60, 70 from projecting beyond the plane of the unit which lies against a mounting wall 79 to which the casing 2 of the switching unit is secured irrespective of the relative orientation of the head 3 with respect to the casing 2.

FIG. 6 illustrates the casing 80 of an auxiliary switch 81 which can be mounted between the head 3 of the switching unit 1 and an actuator such as 45, 60 or 70 of FIGS. 3-5. An operating member 82 of said auxiliary switch extends right through the casing. The lower end 83 of said opening member is located opposite to the top end 37 of the slide-block 27 of FIGS. 3-5. The upper end 84 of said operating member is located opposite to the movable component 54, 65, 75 of an actuator 45, 60, 70 (FIGS. 3-5) of any suitable type. This operating member 82 serves to transmit the movement of the actuator 45, 60, 70 and to provide an additional electrical signal which is present on the terminals 85, 86 as a function of the position of operating member 82.

FIG. 7 illustrates one example of operation of the switching unit 1 associated with an electric actuator within the field of application of an electrical installation in which it is desired to ensure that an access door cannot be opened prior to stopping of an element of a machine having a certain inertia.

Between two lines $L_1$, $L_2$ of the control circuit of a motor M for driving a load L having a high inertia are placed in parallel a control circuit 87 and a safety circuit 88 which are both shown in their quiescent state.

The control circuit comprises in series a startup switch $d_1$, a stop switch $a_1$, a safety switch $s_1$ of the switching unit 1 and a coil Cb of a contactor device K for supplying the motor. Said contactor device actuates two auxiliary switches $C_2$ and $C_1$ in addition to power switches $C_3$, $C_4$, $C_5$. The auxiliary switch $C_1$ has a closing time-delay whilst the auxiliary switch $C_2$ is placed in parallel with the switch $d_1$ and establishes a hold circuit.

The safety circuit comprises a switch $d_2$ which is coupled mechanically with the switch $d_1$, the auxiliary switch $C_1$ and the coil S of the actuator 45 which is associated with the keylock safety switching unit 1.

In this embodiment, the key 22 is coupled with a door P for closing a cubicle 90 which contains the equipment and is indicated by a chain-dotted outline.

In the quiescent state illustrated in the figure in which both motor M and load L are stationary, the electromagnet S of the actuator 45 is supplied with current via the auxiliary switch $d_2$ and via the auxiliary switch $C_1$ which has closed after a time interval which is considered as having already elapsed. The safety switch $s_1$ is therefore open and the rod 30 of the slide-block 27 does not lock the key 22, with the result that the door P can be opened. Opening of the safety switch $s_1$ and of the startup switch $d_1$ prevent the supply of current to the coil Cb of the contactor device K.

When the door is opened, withdrawal of the key 22 confirms by mechanical means 11 (rotary member 11 of FIGS. 1 and 2) the open state of the safety switch $s_1$ and the motor M cannot be restarted even in the event of a power supply failure or any other fault condition in the electromagnet S.

When the door is reclosed, the key 22 displaces the mechanical component 11 in the direction J, but the slideblock 27 remains in the downwardly displaced position since it is acted upon by the the electromagnet S still supplied with current. An action exerted on the startup push-button D established closure of the startup switch $d_1$, interrupts the supply of current to the coil S by opening the auxiliary switch $d_2$, the electromagnet S therefore releases the slide-block 27, the rod 30 of which locks the key 22 whilst the safety switch $s_1$ closes and the coil Cb is energized, which has the effect of establishing a hold circuit by closing the auxiliary switch $C_2$ and of causing instantaneous opening of the auxiliary switch $C_1$. This switch thus maintains deenergization of the coil S, despite the fact that the switch $d_2$ recloses after release of the startup push-button.

When the installation is stopped by actuating the stop push-button A which opens the stop switch $a_1$ is opened, de-energization of the coil Cb of the contactor device K initiates closing of the time-delay switch $C_1$ only after a time interval which is sufficient to ensure that the motor and the load are at a complete standstill.

In the alternative embodiment illustrated in FIG. 8, the key 22 provides for the rod 30 a central notch 25, the from end 26 of which has a necked portion 125 having a width which is slightly larger than the diameter d of the annular channel 40 of the slide-block 27 and smaller than the diameter D of the rod 30. In this embodiment, the axes Y—Y' and V—V' intersect each other.

What we claim is:

1. A keylock safety switching unit, comprising a key selectively insertable within a key-receiving assembly, said assembly comprising:
   - at least one switch provided with a control member movable between two control positions corresponding to two conditions of the switch;
   - a movable component mounted within said assembly and displaceable by said key between an inserted-key position and a withdrawn-key position;
   - a transmission member mounted operatively between said movable component and said control member of said switch for displacing said control member between the two control positions thereof;
   - a locking member connected to said transmission member for displacement therewith, said locking member being in a key-locking position when said transmission member is in a position allowed by the movable component when said movable component is in the inserted-key position, and said locking member being in a key-release position when said movable component is in the withdrawn-key position; and
   - means for selectively urging said locking member to the key release position when said movable component is in the inserted-key position.

2. A keylock safety switching unit according to claim 1 wherein the locking member and the transmission member are slidable along parallel axes.

3. A keylock safety switching unit according to claim 1, wherein the locking member is carried by a slide-block provided with a recess which registers with a path of travel of the key when the locking member is in the key release position, said slide-block projecting into a notch of the key when the key is inserted and the locking member is in the key-locking position.

4. A keylock safety switching unit according to claim 3, wherein said notch is provided in a side edge of said key.

5. A keylock safety switching unit in accordance with claim 1 wherein a coupling portion of the locking member and of the transmission member is provided with lug facing a cam surface of the movable component in a region which is inaccessible through a key hole opening of the key-receiving assembly, said locking member being subjected to the action of resilient means biasing the lug into contact with the cam surface.

6. A keylock safety switching unit in accordance with claim 1, wherein the means for selectively urging said locking member comprises an end of said locking member accessible from outside through an aperture in housing means of said key-receiving assembly.

7. A keylock safety switching unit in accordance with claim 1, wherein the means for selectively urging the locking member comprises an ancillary actuating device secured to housing means of the key-receiving assembly.

8. A keylock safety switching unit in accordance with claim 7, wherein the key-receiving unit comprises a casing accommodating said switching and a head accommodating said movable component, said ancillary actuating device is secured to an accessible surface of said head, and screws securing the head to the casing.

9. A keylock switching unit in accordance with claim 8, wherein screws securing the ancillary actuating device to the head also secure the head to the casing.

10. A keylock safety switching unit in accordance with claim 8, wherein the ancillary actuating device is selectively orientable with respect to the casing and has a transverse cross-section which is inscribed within a contour of said surface of said head in any operative orientation of the ancillary actuating device with respect to the casing.

11. A keylock safety switching unit in accordance with claim 7, comprising an auxiliary contact casing provided with an operating member extending there across, said auxiliary contact casing being mounted between the keyreceiving assembly and the ancillary actuating device with said operating member acting as a transmission means between the ancillary actuating device and the locking member.

12. A keylock safety switching unit in accordance with claim 7, wherein the ancillary actuating device is selected from the group consisting of devices which are sensitive to an electric parameter, devices which are sensitive to a pneumatic parameter and devices which are sensitive to a thermal parameter.

* * * * *